United States Patent [19]
Kojima

[11] Patent Number: 5,207,163
[45] Date of Patent: May 4, 1993

[54] LEG ATTACHING TOOL

[76] Inventor: Toshio Kojima, 5-5-2, Chyu-ou, Kasukabe-shi, Saitama-ken, Japan

[21] Appl. No.: 732,808

[22] Filed: Jul. 19, 1991

[30] Foreign Application Priority Data

Jul. 31, 1990 [JP] Japan .................... 2-81471[U]

[51] Int. Cl.$^5$ ................................ A47B 3/06
[52] U.S. Cl. .................... 108/157; 108/156; 248/188.1
[58] Field of Search ............ 108/157, 158, 159, 156, 108/153, 154; 248/188.1, 188.8

[56] References Cited

U.S. PATENT DOCUMENTS

| | | | |
|---|---|---|---|
| 525,756 | 9/1894 | Bennett | 108/157 |
| 586,276 | 7/1897 | Sellinger | 108/156 |
| 705,653 | 7/1902 | Davis | 248/188.8 |
| 793,980 | 7/1905 | Bolens | 248/188.1 |
| 1,204,736 | 11/1916 | Bolons | 248/188.1 |
| 3,265,342 | 8/1966 | Brettner | 108/156 X |
| 3,636,894 | 1/1972 | Hage | 108/156 |
| 4,163,537 | 8/1979 | Mourgue | 108/156 X |
| 4,575,275 | 3/1986 | Sterte | 108/156 X |

Primary Examiner—Jose V. Chen

[57] ABSTRACT

A leg attaching tool comprising a top plate attaching member and a leg attaching member, wherein a top plate engaging hole of a predetermined shape is formed in the main body of the top plate attaching member which is attached to a top plate of a table, a top plate contact surface which is inclined at a predetermined angle from the lower inner central side to an upper outer edge side is formed on the top plate engaging hole, and a top plate fixing hole into which a fixing device is threadably inserted is formed in the top plate main body, and that the leg attaching member comprises, a main body and an attaching body which are attached to a leg of the table, an engaging body of a predetermined shape which is inserted into the top plate engaging hole is provided on the main body of the leg attaching member, said engaging body having a contact surface which is inclined at a predetermined angle from a lower inner central side to an upper outer edge side and is brought into contact with the top plate contact surface, and a fixing hole into which the fixing device is inserted is formed in the main body of the leg attaching member.

10 Claims, 6 Drawing Sheets

LEG ATTACHING TOOL

BACKGROUND OF THE INVENTION

1. Field of the Invention

This invention relates to a leg attaching tool and, more particularly, to a leg attaching tool in which the attaching directions of a leg, whose attaching direction is set depending on the shapes of the leg, can be easily positioned, the legs can be strongly attached, the number of parts can be reduced, and the cost can be reduced.

2. Description of the Prior Art

As leg attaching tools for attaching legs to a top plate or panel of a table, hitherto there have been suggested tools of the screwing-type, tools of the engaging-type, and the like. According to the leg attaching tool of the screwing-type, a top plate attaching member attached to the top plate of the table and a leg attaching member attached to the leg of the table are threadably engaged and the leg is rotated and clamped, thereby attaching the leg to the top plate. According to the leg attaching tool of the engaging-type, the leg, or a leg attaching member attached to the leg, is brought into engagement with a positioning member attached to the top plate and is positioned, and then the leg attaching member is fixed to the top plate attaching member attached to the top plate by using a fixing device, such as a screw or the like, thereby attaching the leg to the table.

In the screwing-type leg attaching tool, the leg is rotated during attaching. Therefore, no inconvenience occurs when a cylindrical leg, whose attaching direction is not set depending on the leg shape, is attached by a screwing-type leg attaching tool.

However, if a prismatic or polygonal leg, whose attaching direction is set depending the leg shape, is attached by the screwing-type leg attaching tool, there is the inconvenience that it is difficult to accurately establish the attaching direction of the prismatic leg because the leg is rotated during the leg attaching step.

To solve this problem, each of the attaching members of the screwing-type leg attaching tool must be accurately made and each of the component members must be attached to provide the correct position of the top plate or the leg so that the attaching direction, depending on the shape of the prismatic leg, can be accurately positioned upon completion of the screwing operation. Therefore, since high precision is required in the making of each attaching member and the attaching of same to the top plate or the leg, there is the inconvenience that an increase in cost is caused. Moreover, the screwing-type leg attaching tool has the problem that the leg is rotated during use, looseness easily occurs in the attaching state and there is the inconvenience that it is difficult to strongly and rigidly attach the leg.

According to the engaging-type leg attaching tool, the attaching direction of the leg, depending on the leg shape, can be accurately positioned regardless of whether the leg is cylindrical or prismatic. However, since positioning members for positioning are needed, there is the problem that the number of parts is increased and there is the inconvenience that it is disadvantageous in terms of the cost.

It is, therefore, an object of the invention to provide a leg attaching tool in which the attaching direction of a leg, which attaching direction is set depending on the leg shape, can be easily established, the leg can be strongly attached, the number of parts can be reduced, and the cost can be reduced.

SUMMARY OF THE INVENTION

To accomplish the above object, the invention provides a leg attaching tool comprising a top plate attaching member and a leg attaching member, in which for the top plate attaching member, a top plate engaging hole of a predetermined shape is formed in the main body of the top plate attaching member which is attached to the top plate of a table, a top plate contact surface which is inclined at a predetermined angle from the lower inner central side toward an upper outer edge side is formed on the top plate engaging hole, and a top plate fixing hole into which a fixing device is threadable is formed in the top plate main body, and that for the leg attaching member, there are provided a leg main body and a leg attaching body which are attached to the leg of the table, a leg engaging body of a predetermined shape which is inserted into the top plate engaging hole is provided on the leg main body, a leg contact surface which is inclined at a predetermined angle from a lower inner central side toward an upper outer edge side and is brought into contact with the top plate contact surface is provided for the leg engaging body, and a leg fixing hole into which the fixing device is inserted is formed in the leg main body.

According to the invention, in the leg attaching tool comprising the top plate attaching member and the leg attaching member, the top plate main body of the top plate attaching member is attached to the top plate of the table, the leg main body and the leg attaching body of the leg attaching member are attached to the leg of the table, the leg engaging body of the leg main body is inserted into the top plate engaging hole of the top plate main body, the leg contact surface of the leg engaging body is brought into contact with the top plate contact surface of the top plate engaging hole, and in this state, the fixing device which has been extended into the leg fixing hole of the leg main body is threadably inserted into the top plate fixing hole of the top plate main body and is clamped, thereby fixing the leg attaching member to the top plate attaching member. Thus, the leg is attached to the top plate.

An embodiment of the invention will now be described in detail with reference to the accompanying drawings, in which.

DETAILED DESCRIPTION OF A PREFERRED EMBODIMENT

Figure 1:
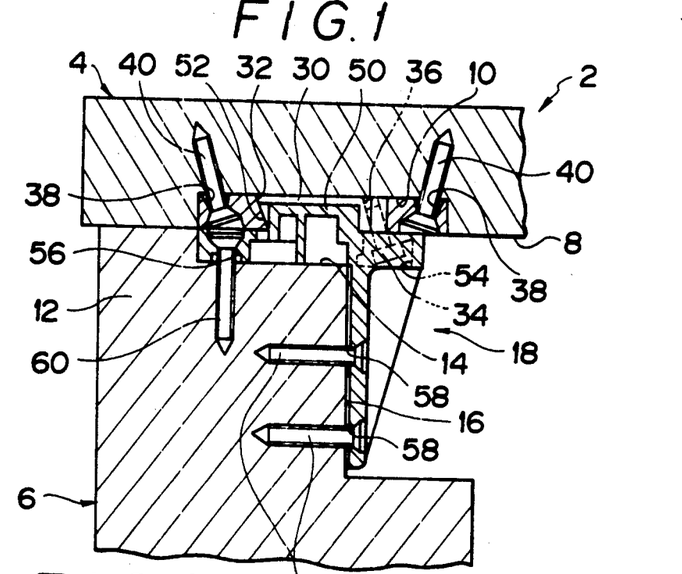
FIG. 1 is a cross sectional view of the leg attaching tool, the leg and the top plate in the assemble condition of the parts.
Figure 2:
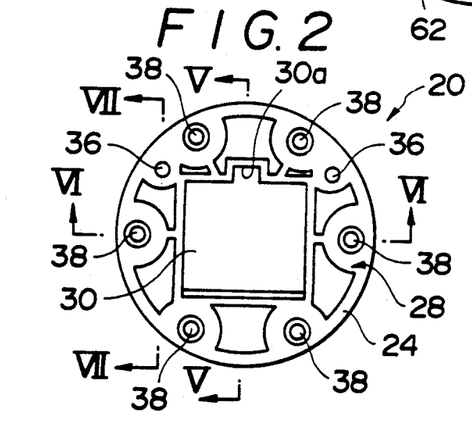
FIG. 2 is a plan view of the top plate attaching member.
Figure 3:
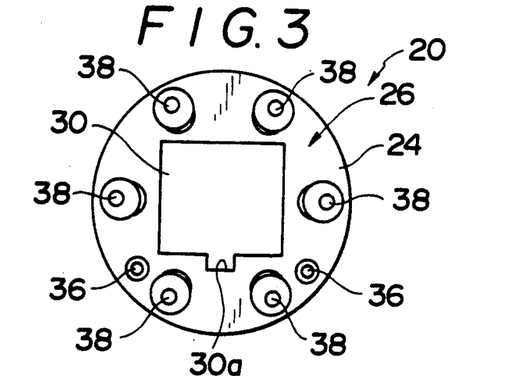
FIG. 3 is a bottom view of the top plate attaching member.
Figure 4:
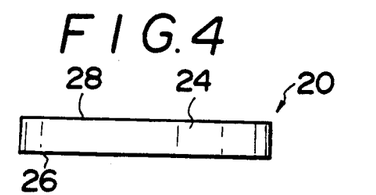
FIG. 4 is a front view of the top plate attaching member.

In FIG. 1, reference numeral 2 denotes a table; 4 a top plate of the table; and 6 a leg of the table. A downwardly opening, substantially circular concavity or recess 10 is formed on the lower surface 8 of the top plate 4 of the table 2. An upwardly opening, partially circular concavity or recess 14 and an upright mounting wall section 16 are formed on the upper end portion 12 of the leg 6 of the table 2.

A leg attaching tool 18 for attaching the leg 6 to the top plate 4 of the table 2 comprises a top plate attaching member 20 and a leg attaching member 22.

Figure 5:
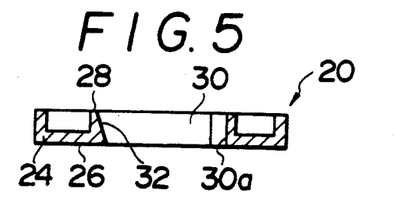
FIG. 5 is a cross sectional view taken along the line V—V in FIG. 2.

As shown in FIGS. 2 to 7, the top plate attaching member 20 has a substantially disk-shaped top plate main body 24 which is attached to the top plate 4 by being inserted into the attaching concavity 10 formed in the top plate 4 of the table 2. The top plate main body 24 is formed with a top plate engaging hole 30 having a predetermined shape, such as a substantially quadrangular shape in the embodiment shown in the drawing, which hole extends from the lower surface 26 to the upper surface 28 of the main body 24. As shown in FIG. 5, one side of the substantially quadrangular top plate engaging hole 30 is formed with a top plate contact surface 32 which is inclined from the lower, inner, central side toward the upper, outer, edge side at a predetermined angle. Reference numeral 30a denotes a positioning concave portion or slot.

Figure 6:
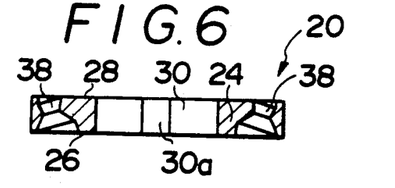
FIG. 6 is a cross sectional view taken along the line VI—VI in FIG. 2.
Figure 7:
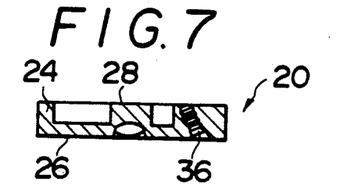
FIG. 7 is a cross sectional view taken along the line VII—VII in FIG. 2.

Two fixing holes 36 for the top plate attaching member 20, into which fixing screws 34 serving as fixing devices are threadably inserted, are formed on the top plate main body 24. As shown in FIGS. 1 and 7, the top plate attaching member fixing holes 36 are each inclined at a predetermined angle that is substantially the same as the angle of inclination of the top plate contact surface 32. Reference numeral 38 denotes attaching holes for the top plate main body 24. The main body attaching holes 38 for the top plate main body 24 are formed so as to be widened from the lower inner rear side toward the upper outer edge side as shown in FIGS. 1 and 6. The top plate attaching member 20 is attached by inserting and screwing attaching screws 40 for the top plate main body 24 into the top plate 4.

As shown in FIGS. 8 to 15, the leg attaching member 22 has a main body 42 and a side attaching body 44 which are inserted and attached to the concavity 14 and the mounting wall section 16 which are formed on the leg 6 of the table 2. The attaching body 44 extends vertically downwardly from the lower surface 46 of the main body 42. The engaging body 50 of the leg attaching member 44 is provided on the upper surface 48 of the main body 42. The engaging body 50 has a predetermined shape, such as a substantially quadrangular trapezoid in the embodiment shown in the drawings, and is slidably receivable into the top plate engaging hole 30 of the top plate main body 24. A contact surface 52 is formed on one side of the almost quadrangular trapezoid leg side engaging body 50. The contact surface 52 is inclined at a predetermined angle from the lower, inner, central side toward the upper, outer, edge side and it contacts the top plate contact surface 32 of the top plate engaging hole 30. Reference numeral 50a denotes a positioning projection which is received in the slot 30a.

Figure 8:
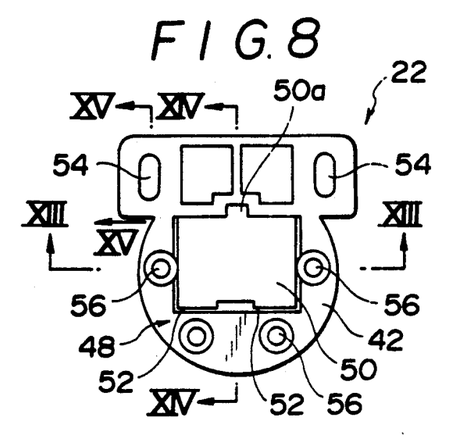
FIG. 8 is a plan view of the leg attaching member.
Figure 9:
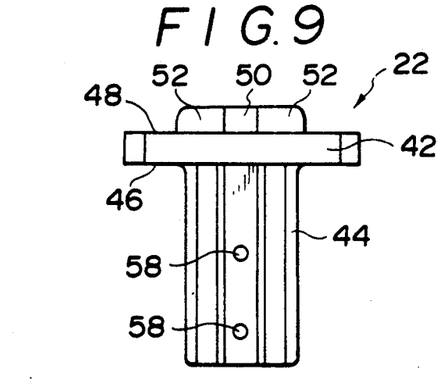
FIG. 9 is a front view of the leg attaching member.
Figure 10:
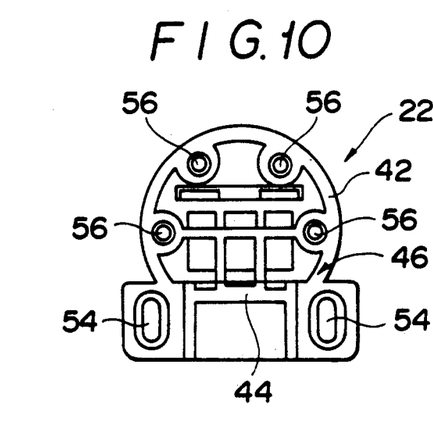
FIG. 10 is a bottom view of the leg attaching member.
Figure 11:
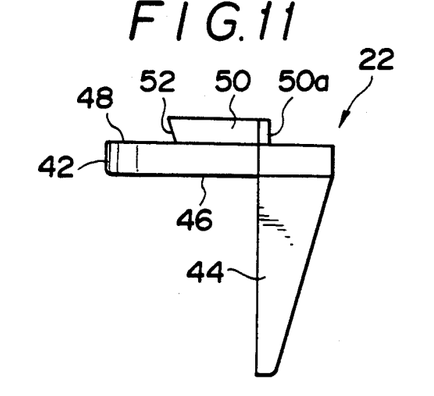
FIG. 11 is a side elevational view of the leg attaching member.
Figure 12:
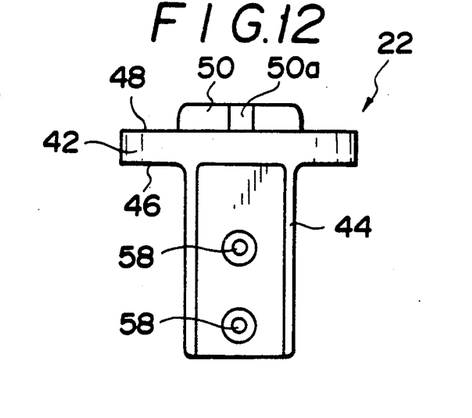
FIG. 12 is a rear view of the leg attaching member.
Figures 13, 14:
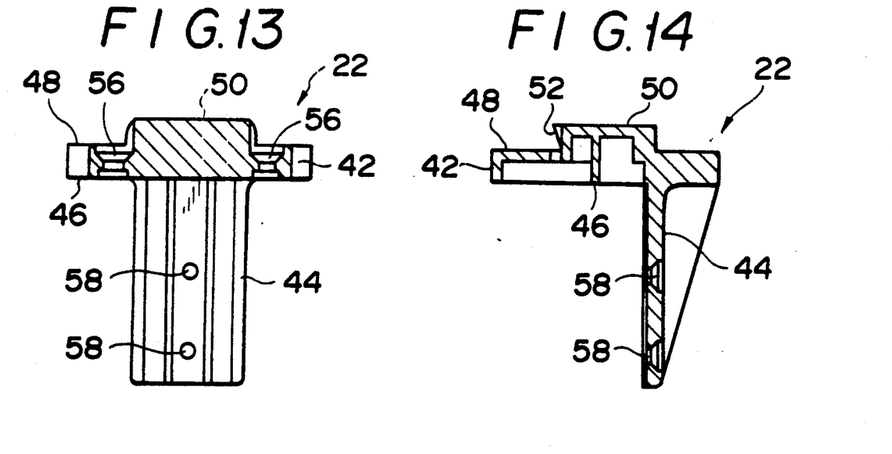
FIG. 13 is a cross sectional view taken along the line XIII—XIII in FIG. 8.
FIG. 14 is a cross sectional view taken along the line XIV—XIV in FIG. 8.
Figure 15:
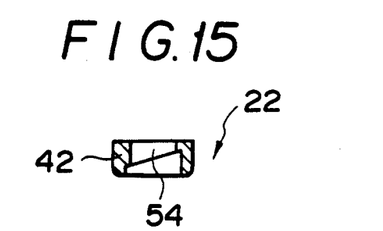
FIG. 15 is a cross sectional view taken along the line XV—XV in FIG. 8.
Figure 16:
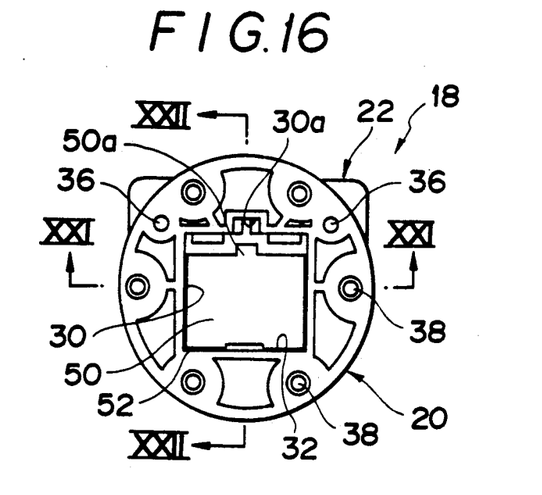
FIG. 16 is a plan view of the tool in which the leg attaching member has been attached to the top plate attaching member.
Figure 17:
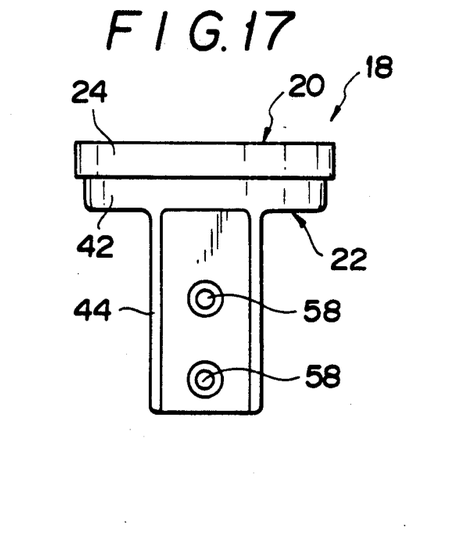
FIG. 17 is a front view of the tool in which the leg attaching member has been attached to the top plate attaching member.
Figure 18:
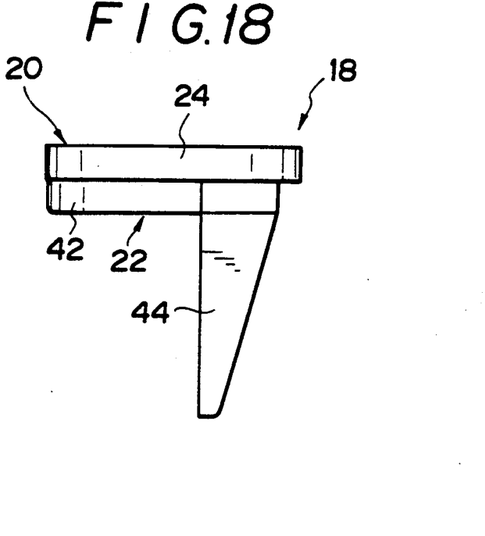
FIG. 18 is a side elevational view of the tool in which the leg attaching member has been attached to the top plate attaching member.
Figure 19:
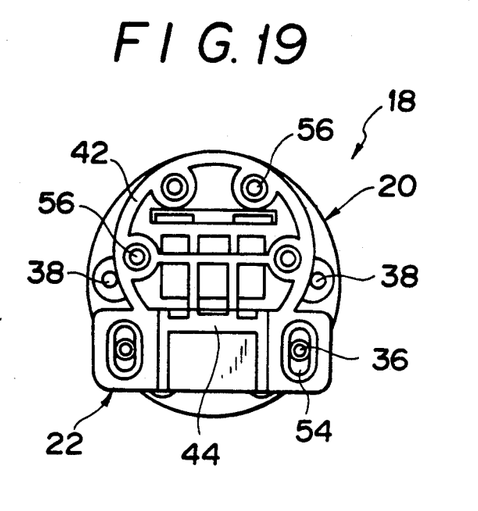
FIG. 19 is a bottom view of the tool in which the leg attaching member has been attached to the top plate attaching member.
Figure 20:
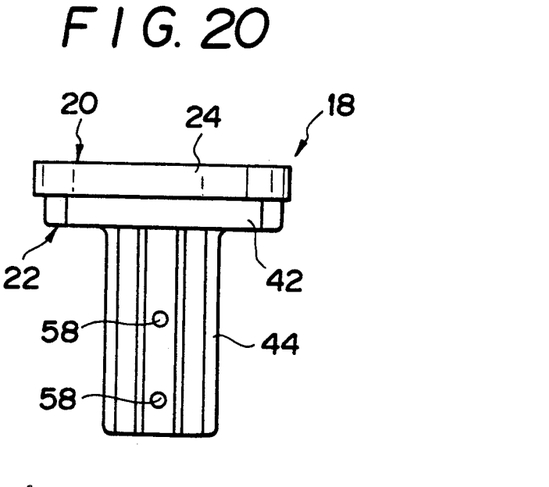
FIG. 20 is a rear view of the tool in which the leg attaching member has been attached to the top plate attaching member.
Figure 21:
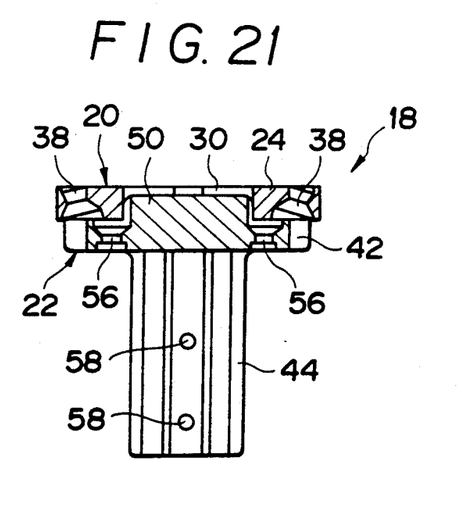
FIG. 21 is a cross sectional view taken along the line XXI—XXI in FIG. 16.
Figure 22:
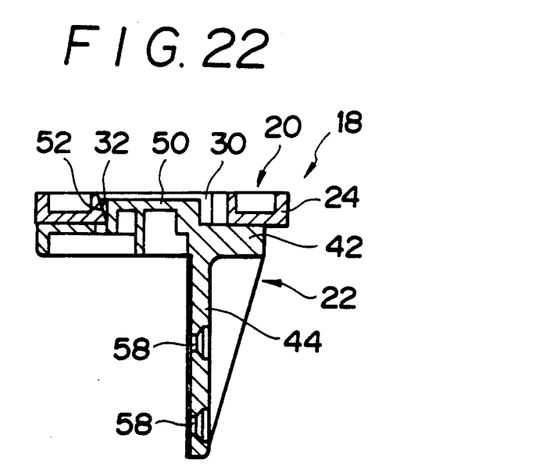
FIG. 22 is a cross sectional view taken along the line XXII—XXII in FIG. 16.

Two leg fixing holes 54, into which the fixing screws 34 serving as fixing devices are inserted, are formed in the main body 42 of the leg attaching member. As shown in FIGS. 1, 8 and 15, both of the fixing holes 54 are formed in an elliptical shape and are inclined at a predetermined angle which is substantially equal to the angle of inclination of the contact surface 52. The leg fixing holes 54 coincide with the top plate fixing hole 36 of the top plate side main body 24. Reference numeral 56 denotes attaching holes for the main body of the leg attaching member 22. Reference numeral 58 denotes attaching holes for the leg side attaching body 44. As shown in FIG. 1, by inserting attaching screws 60 for the main body 42 and attaching screws 62 for the side attaching body 44 into the attaching holes 56 and 58 and screwing same into the leg 6, the attaching member 22 is attached to the leg 6.

As mentioned above, when attaching the parts wherein there is used the leg attaching tool 18 comprising the top plate attaching member 20 and the leg attaching member 22, as shown in FIGS. 16 to 22, the projecting body 50 of the main body 42 of the leg attaching member is inserted into the top plate engaging hole 30 of the top plate main body 24. The contact surface 52 of the projecting body 50 is brought into contact with the top plate contact surface 32 of the top plate engaging hole 30. In this state, as shown in FIG. 1, the fixing screw 34, which has been inserted into the fixing hole 54 of the main body 42 of the leg attaching member, is threadably inserted into the top plate fixing hole 36 of the top plate main body 24, thereby clamping the parts together. Due to this, the upper surface 48 of the leg attaching member 22 is brought into contact with the lower surface 26 of the top plate attaching member 20. The leg attaching member 22 is fixed to the top plate attaching member 20.

The attaching of the leg 6 to the top plate 4 of the table 2 will now be described.

During attaching, the top plate attaching member 20 and the leg attaching member 22, which, in combination, provide the leg attaching tool 18, are first attached to the top plate 4 and the leg 6, respectively.

Figure 23:
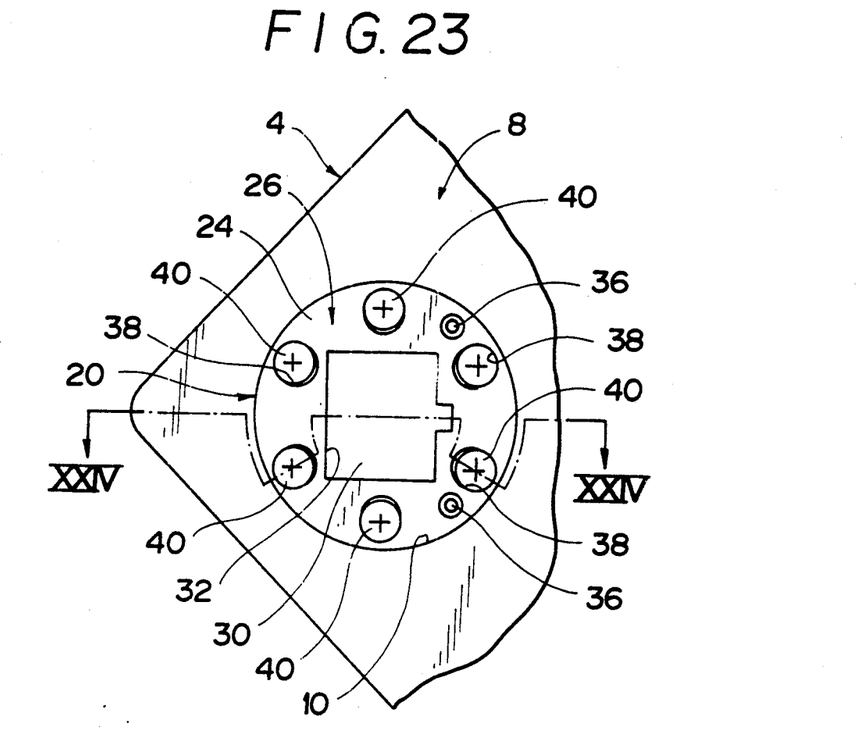
FIG. 23 is a bottom view of the tool in which the top plate attaching member has been attached to the top plate.
Figure 24:
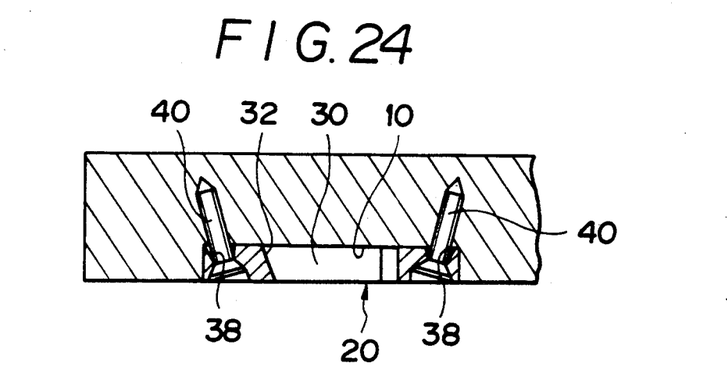
FIG. 24 is a cross sectional view taken along the line XXIV—XXIV in FIG. 23.

As shown in FIGS. 23 and 24, the top plate main body 24 is inserted to the attaching concavity 10 formed on the lower surface 8 of the top plate 4 of the table 2. The attaching screws 40 for the top plate main body 24 are inserted into the main body attaching holes 38 for the top plate and are screwed into the top plate 4. Due to this, the top plate attaching member 20 is attached to the top plate 4. At this time, the top plate contact surface 32 of the top plate side engaging hole 30 is set in a direction such that the attaching direction of the leg 6 can be established, thereby attaching the top plate attaching member 20 to the top plate 4.

Figure 25:
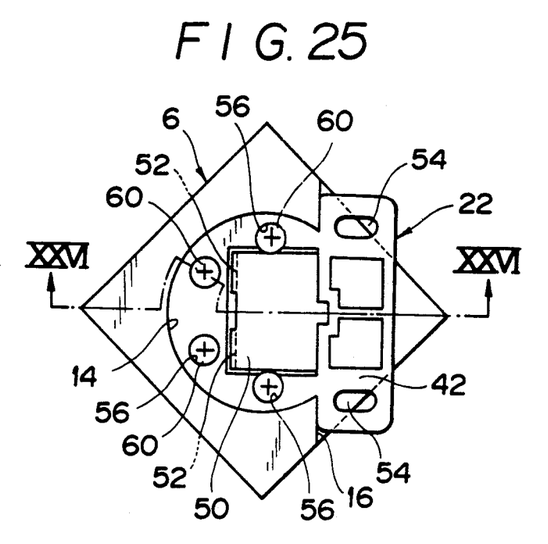
FIG. 25 is a plan view of the tool in which the leg attaching member has been attached to the leg.
Figure 26:
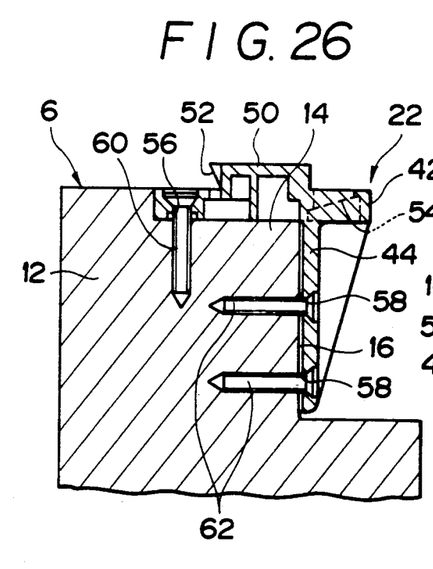
FIG. 26 is a cross sectional view taken along the line XXVI—XXVI in FIG. 25.
Figure 27:
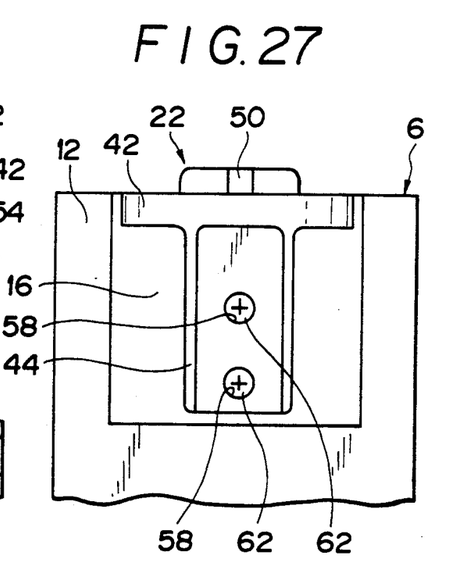
FIG. 27 is a side elevational view of the tool in which the leg attaching member has been attached to a leg.

As shown in FIGS. 25 and 27, the main body 42 and the side attaching body 44 of the leg attaching member 22 are attached to the attaching concavity 14 and the mounting wall section 16 formed on the upper end portion 12 of the leg 6 of the table 2. The attaching screws 60 for the main body 42 and the attaching screws 62 for the side attaching body 44 are inserted into the attaching holes 56 and the attaching holes 58 and are screwed into the leg 6. Due to this, the leg attaching member 22 is attached to the leg 6. At this time, the contact surface 52 of the engaging body 50 is set to a direction such that the attaching direction of the leg 6 can be positioned and determined, thereby attaching the leg attaching member 22 to the leg 6.

The top plate attaching member 20 attached to the top plate 4 and the leg attaching member 22 attached to the leg 6 are then fixed to each as follows.

For the top plate attaching member 20 and the leg attaching member 22, the engaging body 50 of the main body 42 is inserted into the top plate engaging hole 30 of the top plate main body 24 and the contact surface 52 of the engaging body 50 is brought into contact with the top plate contact surface 32 of the top plate engaging hole 30. At this time, the engaging state of the engaging body 50 to the top plate engaging hole 30 can be accurately and easily positioned so that the contact surface 52 can come into contact with the top plate contact surface 32 by positioning the positioning projection 50a of the engaging body 50 in the concave portion 30a of the top plate engaging hole 30.

As mentioned above, in the state in which the engaging body 50 has been inserted into the top plate engaging hole 30 and the contact surface 52 has been brought into contact with the top plate contact surface 32, as shown in FIG. 1, the fixing screws 34 are inserted into the fixing holes 54 of the main body 42 and threadably inserted into the top plate fixing holes 36 of the top plate main body 24, thereby clamping together the top plate attaching member 20 and the leg attaching member 22. The top plate fixing holes 36 and the fixing holes 54 are inclined so as substantially to coincide with the angles of inclination of the top plate contact surface 32 and the contact surface 52, respectively. Therefore, the leg main body 42 is clamped to the top plate main body 24 by the clamping force of the fixing screw 34 in a direction such that the contact surface 52 is brought into contact with the top plate contact surface 32.

Thus, the top surface 48 of the leg attaching member 22 is brought into contact with the lower surface 26 of the top plate attaching member 20. The leg attaching member 22 is fixed to the top plate attaching member 20, so that the leg 6 is attached to the top plate 4.

As mentioned above, for the leg attaching tool 18, the top plate attaching member 20 is attached to the top plate 4 of the table 2. The leg attaching member 22 is attached to the leg 6 of the table 2. The engaging body 50 of the leg main body 42 is inserted into the top plate engaging hole 30 of the top plate main body 24 and the contact surface 52 is brought into contact with the top plate contact surface 32, so that the attaching direction of the leg 6 can be determined. Therefore, the attaching direction of the leg which is set depending on the shape of the leg can be easily determined regardless of the shape of the leg, such a cylindrical shape, prismatic shape, or the like.

The engaging body 50 of the leg attaching member 22 is inserted into the top plate engaging hole 50 of the top plate attaching member 20. The leg attaching member 22 is fixed to the top plate attaching member 20 by the fixing screws 34, so that looseness of the attaching state of the leg 6 can be prevented. Therefore, the leg 6 can be strongly attached to the top plate 4.

Further, the attaching direction of the leg 6 can be determined by the contact between the top plate contact surface 32 of the top plate attaching member 20 and the contact surface 52 of the leg attaching member 22, so that the positioning member can be made unnecessary. Therefore, the number of parts can be reduced and the cost can be reduced.

As mentioned above, according to the invention, for the leg attaching tool comprising the top plate attaching member and the leg attaching member, the top plate main body of the top plate attaching member is attached to the top plate of the table, the main body and the attaching body of the leg attaching member are respectively attached to the leg of the table, the engaging body of the leg main body is inserted into the top plate engaging hole of the top plate main body, and the contact surface of the engaging body is brought into contact with the top plate contact surface of the top plate engaging hole, so that the attaching direction of the leg can be positioned. Therefore, the attaching direction of the leg which is set depending on the shape of the leg can be easily positioned without regard to the shape of the leg such as cylindrical shape, prismatic shape, or the like.

On the other hand, the leg engaging body of the leg attaching member is inserted into the top plate engaging hole of the top plate attaching member and the leg attaching member is fixed to the top plate attaching member by the fixing screws, so that looseness of the attaching state of the leg can be prevented. Therefore, the leg can be strongly attached.

Further, since the attaching direction of the leg can be positioned by the contact between the top plate contact surface of the top plate attaching member and the contact surface of the leg attaching member, the positioning member is unnecessary. Thus, the number of parts can be reduced and the cost can be reduced.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A tool for attaching a leg to a top plate, comprising a top plate attaching member which is attachable to the top plate and a leg attaching member which is attachable to the leg, said top plate attaching member having a main body, said main body of said top plate attaching member having an engaging hole therethrough and said hole has an upwardly and outwardly inclined contact surface, said main body of said top plate attaching member having a fixing hole therein for receiving a threaded fixing member, said leg attaching member having a main body and a side body, said main body of said leg attaching member having a guide projection extending therefrom and removably received in said engaging hole of said top plate attaching member, said guide projection having an upwardly and outwardly inclined contact surface which is removably engaged with said contact surface of said engaging hole, said leg attaching member having a fixing hole alignable with said fixing hole of said top plate attaching member so that when said fixing holes are aligned, the threaded fixing member is threaded into said holes to clamp said top plate attaching member to said leg attaching member and thereby clamp the leg to the top plate.

2. A tool as claimed in claim 1 in which said top plate attaching member is substantially circular and it has a plurality of circumferentially spaced-apart mounting holes therethrough so that it can be mounted in a series of circumferentially spaced-apart positions on the top plate.

3. A tool as claimed in claim 1 in which said engaging hole is polygonal in plan view and said guide projection is correspondingly polygonal, said contact surface of said hole is substantially one side of the polygon thereof and said contact surface of said guide projection is the corresponding one side of the polygon thereof.

4. A tool as claimed in claim 3 in which said engaging hole has a positioning recess in another one of the sides of the polygon thereof and said guide projection has a corresponding positioning projection on the corresponding another one of the sides of the polygon thereof and projecting into said positioning recess.

5. A tool as claimed in claim 1 in which said contact surfaces and said fixing holes are inclined with respect to the vertical at corresponding angles.

6. An article of furniture comprising a top panel having a recess in its underside, a leg having a recess in its upper end and an upright mounting wall section extending downwardly from, one side of said recess in a said side wall of said leg, a top plate attaching member which received in said recess in said top plate, a leg attaching member which is received in said recess in said leg, said top plate attaching member having a main body disposed in said recess in said top plate and screws for securing said top plate attaching member to said top plate, said main body of said top plate attaching member having an upwardly extending engaging hole therethrough and said engaging hole has an upwardly and outwardly inclined contact surface, said main body of said top plate attaching member having a threaded fixing hole therein, said leg attaching member having a main body and a side body, said main body of said leg attaching member being disposed in said recess in said leg and said side body of said leg attaching member including attaching holes being disposed against said side wall and screws for securing said side wall to said leg, said main body of said leg attaching member having a guide projection extending upwardly therefrom and received in said engaging hole of said top plate attaching member, said guide projection having an upwardly and outwardly inclined contact surface which is engaged with said contact surface of said engaging hole, said leg attaching member having a fixing hole aligned with said fixing hole of said top plate attaching member, a threaded fixing member threaded into said holes to clamp said top plate attaching member to said leg attaching member and thereby, clamp the leg to the top plate.

7. An article of furniture as claimed in claim 6 in which said recess is circular, said top plate attaching member is circular so that it can be moved circumferentially in said recess and it has a plurality of circumferentially spaced-apart mounting holes extending therethrough, said screws being threadable into said holes so that said top plate engaging member can be mounted in a series of circumferentially spaced-apart positions on said top plate.

8. An article of furniture as claimed in claim 6 in which said engaging hole is polygonal in plan view and said guide projection is correspondingly polygonal, said contact surface of said hole is one side of the polygon thereof and said contact surface of said guide projection is the corresponding one side of the polygon thereof.

9. An article of furniture as claimed in claim 8 in which said engaging hole has a positioning recess in another one of the sides of the polygon thereof and said guide projection has a corresponding positioning projection on the corresponding another one of the sides of the polygon thereof and projecting into said positioning recess.

10. An article of furniture as claimed in claim 6 in which said contact surfaces and said fixing holes are inclined with respect to the vertical at corresponding angles.

* * * * *

UNITED STATES PATENT AND TRADEMARK OFFICE
CERTIFICATE OF CORRECTION

PATENT NO.  :   5,207,163

DATED       :   May 4, 1993

INVENTOR(S) :   Toshio KOJIMA

It is certified that error appears in the above-identified patent and that said Letters Patent is hereby corrected as shown below:

Column 7, line 26, after "into said" insert --fixing--

Column 7, line 53, delete "said" (second occurrence).

Signed and Sealed this

Twenty-second Day of March, 1994

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5 207 163
DATED : May 4, 1993
INVENTOR(S) : Toshio KOJIMA It is certified that error appears in the above-identified patent and that said Letters Patent is hereby corrected as shown below:

Column 7, line 26; after "into said" insert ---fixing---.
        line 53; delete ",".
              delete "said" (second occurrence).
Column 8, line 24; after "said" insert ---fixing---.
        line 29; after "recess" insert ---in said top plate---.

This certificate supersedes Certificate of Correction issued March 22, 1994.

Signed and Sealed this

Twenty-seventh Day of September, 1994

Attest:

BRUCE LEHMAN

*Attesting Officer*    *Commissioner of Patents and Trademarks*